April 3, 1928.

A. EDELHOFF 1,664,773

POTATO PLANTING MACHINE

Filed April 18, 1927

Inventor:
Alfred Edelhoff
by Hans Hedrich, P.D.
Attorney

Patented Apr. 3, 1928.

1,664,773

UNITED STATES PATENT OFFICE.

ALFRED EDELHOFF, OF VOLKMARSEN, GERMANY.

POTATO-PLANTING MACHINE.

Application filed April 18, 1927, Serial No. 184,762, and in Hungary January 1, 1926.

With the potato planting machines with obliquely located axle and a downwardly inclined frontal wall provided with spoon- or scoop-like potato holders taking up the potatoes singly, and with holes provided in the proximity of the circumference of said wall, the reliable planting of the individual potatoes is warranted, it is true, but it is nevertheless desired to increase the efficiency of the machine. This problem is solved by the present invention by providing within the drum-shaped receptacle partition walls that subdivide the interior of the drum into a plurality of compartments or chambers communicating with each other through recesses provided in the rims of these walls and being located in staggered arrangement. Oblique guide members are provided between the individual potato holders and serve to prevent the formation of rows or the damming up of the potatoes in the spaces between the potato holders.

Figure 1:
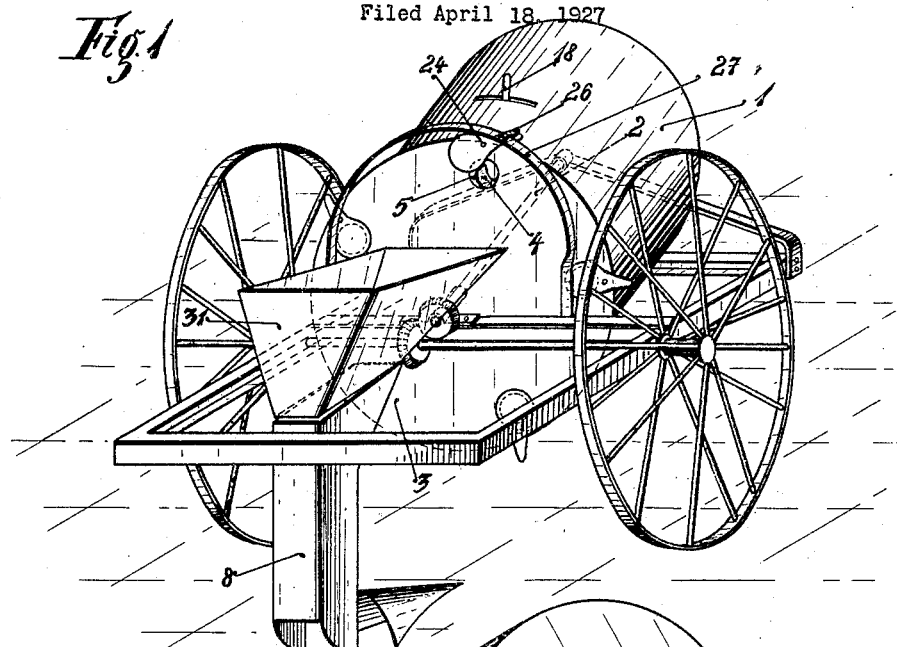
Figure 2:
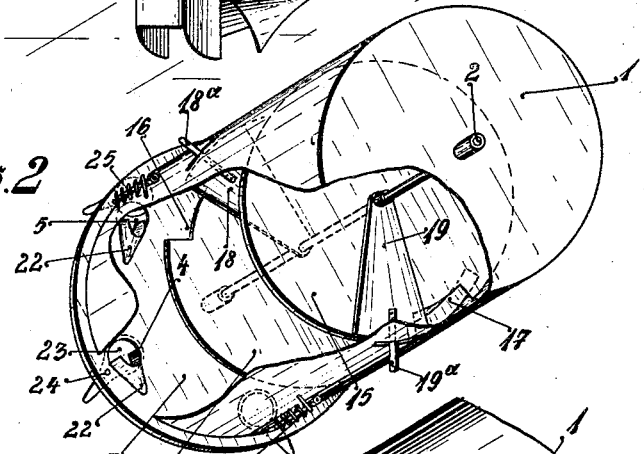
Figure 3:
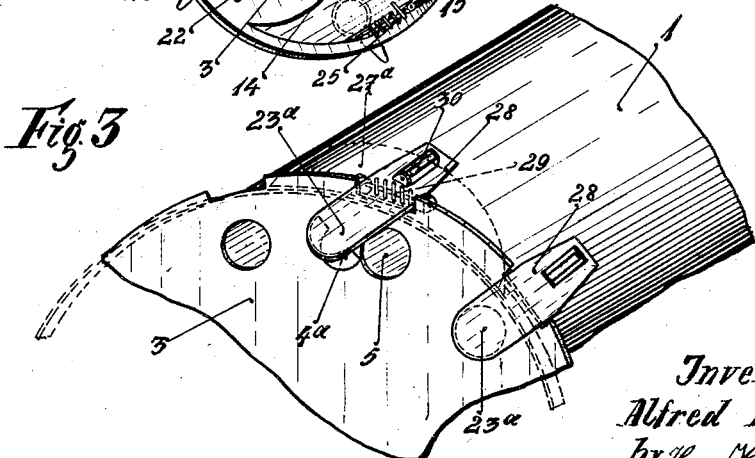

The invention is illustrated diagrammatically and by way of example on the accompanying drawing on which Figure 1 is a perspective representation of a potato planter designed according to this invention, Figure 2 is a perspective illustration of the potato receptacle, with partly removed shell and frontal wall in order to show the interior of the receptacle, and Figure 3 shows some details of a modification drawn to an enlarged scale and dealt with fully hereinafter.

On the drawing, 1 denotes the drum-shaped potato receptacle which is arranged obliquely, as shown; 2 is the correspondingly obliquely arranged shaft of the drum 1 and is rotated by the intermediary of a bevel-wheel gearing driven by the axle of the two large wheels. This arrangement and combination of motion-conveying parts does not form part of this invention.

The spoon-like or scoop-like potato holders 4 are located at the inner surface of the rear frontal wall or bottom 3 of the drum, and there are, besides, within the drum, partition walls 14 and 15 that subdivide the interior of the drum into three compartments or chambers which communicate with each other through recesses 16 and 17 provided in the rims of the partition walls and establishing staggered communications between said chambers, that is to say, they permit the potatoes to pass singly from one chamber into the next, and so on. The free area of said recesses can be varied by turnable slides 18 and 19 carried by the shaft 2 and having projections 18$^a$ and 19$^a$ extending outwardly through slots in the drum shell and serving as grips for turning said slides more or less so as to vary correspondingly the free area of the recesses 16 and 17.

I wish it to be understood that I do not limit myself to any definite number of the partition walls in the drum. The number depends chiefly upon the length of the drum, but also the size of the potatoes in the respective district may require consideration.

In order to prevent the formation of rows between the potato holders or to prevent damming of the same, the potato holders 4 are provided with oblique guide-members 22, the shape and size of which may be chosen as desired. Said members 22 are located in front of openings 5 provided in the rear bottom 3 of the drum, and the potatoes to be planted are conveyed through these openings into a hopper 31 from which they fall into the delivery tube 8. The openings 5 can be closed more or less by the members 23, each of which is fulcrumed at 24 and kept closed by a spring 25. When the drum is rotated every member 23 arriving in its highest position contacts there with an abutment member 26 projecting forth from a bow 27 affixed to the frame of the machine, and that member 23 is then so turned as to open the respective opening 5 so that the potato that has been carried upward by the respective potato holders falls from the same into the hopper and through this into the delivery tube 8. It is desirable to shape the spoons or scoops forming the potato holders so that always only one potato can be received in each of them, but I wish it to be understood that I do not limit myself neither as regards this number, nor as regards any particular shape of said potato holders.

The reliability of service of the machine can be increased still more by modifying the closing members of the openings 5 in the manner shown in the modification Fig. 3, in which these members (now 23$^a$) are no more to be turned parallel to the bottom 3, but are movable at right angles thereto, that is to say, they can be swung away from, and towards and against, that bottom. The potato holders (now 4$^a$) do not form separate parts located within the drum, but each is attached to one of said closing members 23ª and extends into the drum as long as the appertaining opening 5 is kept closed by the respective member 23, whereas it is moved out of the drum (together with a potato on it) when the respective member 23ª is swung off the bottom. Every closing member 23ª forms practically a double-armed lever which is under the action of a spring 29 tending to keep the respective member in contact with the bottom 3 so as to keep the respective opening 5 closed, but there is provided a stationary curved member 27ª that co-operates with the outer arms 28 of the closing members and moves the arms 23ª away from the openings 5 when they pass over that curved member. Each arm 28 may be provided with an anti-friction roll that co-operates with the curved guide-member 27ª.

I do not limit myself to any definite number of the openings 5, nor to any distinct constructional form of the springs 29. There may be departures in these and other details, without departing from the invention.

I claim:

1. A potato planting machine, comprising, in combination with a wheeled frame, a drum-shaped receptacle adapted to receive the potatoes and being arranged obliquely, the rear end of its axis lying lower than its front end, partition walls subdividing the interior of said drum into a plurality of compartments, and every partition wall having a recess in its rim, the recesses of the several partition walls being located in staggered arrangement, and means for conveying the potatoes singly out of the said drum, substantially as set forth.

2. A potato planting machine, comprising, in combination with a wheeled frame, a drum-shaped receptacle adapted to receive the potatoes and being arranged obliquely, the rear end of its axis lying lower than its front end, partition walls subdividing the interior of said drum into a plurality of compartments, and every partition wall having a recess in its rim, the recesses of the several partition walls being located in staggered arrangement, means for varying the free area of said recesses, and means for conveying the potatoes singly out of the said drum, substantially as set forth.

3. A potato planting machine, comprising, in combination with a wheeled frame, a drum-shaped receptacle adapted to receive the potatoes and being arranged obliquely, the rear end of its axis lying lower than its front end, partition walls subdividing the interior of said drum into a plurality of compartments, and every partition wall having a recess in its rim, the recesses of the several partition walls being located in staggered arrangement, potato holders for conveying the potatoes singly out of the said drum, and oblique guide-members arranged between the individual potato holders, substantially and for the purpose set forth.

4. A potato planting machine, comprising, in combination with a wheeled frame, a drum-shaped receptacle adapted to receive the potatoes and being arranged obliquely and having potato discharging openings in its rear wall, the rear end of the axis of said drum lying lower than its front end, partition walls subdividing the interior of said drum into a plurality of compartments, and every partition wall having a recess in its rim, the recesses of the several partition walls being located in staggered arrangement, double-armed levers arranged at said openings outside said rear wall, potato receiving scoops attached to the radially inwardly directed arms of said levers and lying normally within the said openings, and a stationary curved deflecting member adapted to act on the radially outwardly directed arms of said levers, substantially and for the purpose set forth.

In testimony whereof I affix my signature.

ALFRED EDELHOFF.